United States Patent [19]

Fife

[11] Patent Number: 5,284,531
[45] Date of Patent: Feb. 8, 1994

[54] CYLINDRICAL METAL FIBERS MADE FROM TANTALUM, COLUMBIUM, AND ALLOYS THEREOF

[75] Inventor: James A. Fife, Douglassville, Pa.

[73] Assignee: Cabot Corporation, Boston, Mass.

[21] Appl. No.: 31,254

[22] Filed: Mar. 10, 1993

Related U.S. Application Data

[62] Division of Ser. No. 923,402, Jul. 31, 1992.

[51] Int. Cl.$^5$ .............................................. B22F 1/00
[52] U.S. Cl. ..................................... 148/513; 75/952;
75/255; 419/24; 419/31; 420/425; 420/427
[58] Field of Search ................. 420/425, 427; 419/24,
419/31; 148/513; 75/952, 255

[56] References Cited

U.S. PATENT DOCUMENTS

| | | | |
|---|---|---|---|
| 3,295,951 | 1/1967 | Fincham et al. | 420/427 |
| 3,461,047 | 8/1969 | Lenny | 148/668 |
| 4,502,884 | 3/1985 | Fife | 420/427 |
| 4,722,756 | 2/1988 | Hard | 148/513 |
| 4,960,471 | 10/1990 | Fife et al. | 148/20.3 |

Primary Examiner—Donald P. Walsh
Assistant Examiner—Anthony R. Chi
Attorney, Agent, or Firm—Harry J. Gwinnell

[57] ABSTRACT

A method of making a tantalum capacitor of improved specific capacitance (and volumetric efficiency) is described. Short tantalum fibers are precipitated out of a carrier liquid to form a felt, or tumbled to form fiber containing particles, and in either case subsequently bonded so as to form a felt or particles containing the fibers in random orientation in substantially non-aligned array. These particles or felt are heated to bond the fibers together, purify and (optionally) cylindricalize them. The felt or particles can be processed in conventional fashion thereafter to form the capacitor. Cylindricalized fibers and pellets of increased surface area are also described.

16 Claims, 2 Drawing Sheets

CYLINDRICAL METAL FIBERS MADE FROM TANTALUM, COLUMBIUM, AND ALLOYS THEREOF

This application is a division of commonly assigned, copending application Ser. No. 07/923,402, filed on Jul. 31, 1992.

TECHNICAL FIELD

The field of art to which the invention pertains is particulate tantalum and capacitors made therefrom.

BACKGROUND ART

Solid-electrolyte tantalum capacitors have been a major contributor to the miniaturization of electronic circuitry. They also operate over a wide temperature range and have good shelf life, long service and are useful in extreme environments.

Such capacitors are typically manufactured by compressing tantalum powder into a pellet and sintering the pellet to form a porous body. The porous body is then anodized in a suitable electrolyte to form a continuous dielectric oxide film on the sintered body. The pores are filled with an electrolyte and a lead wire is attached to form the capacitor.

In order to improve the specific capacitance (and volumetric efficiency) the particle sizes of the tantalum powder used to form the capacitors have been reduced to a smaller and smaller size. With the reduction in size, the temperature required to sinter the particles has dropped dramatically. However, it is also necessary to raise the temperature of the particles high enough during sintering to purify the particles, which has in turn limited the smallest particle size capable of being used so as to not excessively fuse it during the high temperature purification.

Another problem associated with using very small particles is encountered during the subsequent anodization of the capacitor anode body. Because the anodization process consumes the anode metal in an amount proportional to the anodization voltage, the requirements for specified voltage ratings implies severe limitations on how small the particles in a capacitor can be. Particles smaller than a critical size will be totally consumed by the anodization process.

Accordingly, there is a constant search in this art for particles with increased surface area which would be able to withstand temperatures necessary during sintering for cleaning and purification without excessive fusing and loss of surface area, and which will be stable during the anodization process.

BRIEF SUMMARY OF THE INVENTION

The present invention is directed to tantalum fibers particularly adapted for use in capacitors. In one embodiment of the invention cylindrical metal fibers are described having a substantially circular cross-section.

In another aspect of the invention, a bonded body of metal fibers comprising short metal fibers, randomly oriented in a substantially non-aligned, porous array is described. The fibers can be tantalum, columbium, or alloys thereof. In this embodiment, the fibers optionally can also have a substantially circular cross section.

In other aspects of the invention the above fibers can be formed into substantially spherical agglomerates of fibers; felt; or pellets.

A method of making felt capacitor material containing fibers of tantalum, columbium, or alloys thereof, is also described. The fibers are dispersed in a carrier such as water. The fibers typically having a length of up to 400 microns. The water or other carrier is removed by filtering, thereby forming a felt of fibers randomly oriented in a substantially non-aligned porous array particularly adapted for use in a capacitor.

A method of making cylindrical metal fibers of tantalum, columbium, or alloys thereof is also described. The fibers are heated at a temperature and for a period of time sufficient to produce a substantially circular cross-section.

A method of making particles (spherical agglomerates) of bonded, fibrous tantalum, columbium, or their alloys is also described. The fibers are tumbled so as to cause them to randomly orient in a substantially non-aligned, porous array. The fibers typically have a length of up to about 400 microns.

A method of making metal fiber containing capacitor material is also described. Particles of bonded, fibrous tantalum, columbium, or their alloys, are pressed and heated so as to bond the particles together. The fibers are randomly oriented in a substantially non-aligned, porous array. The capacitor material can also be heated so as to purify the fibers, and further heated to cause the individual fibers to form a substantially circular cross-section.

Capacitors made from the above methods and articles exhibit improved specific capacitance (and volumetric efficiency), while also benefiting from a high degree of chemical clean-up from high temperature thermal treatment. The circular cross-section further provides for a stable surface area during anodization.

DETAILED DESCRIPTION OF THE INVENTION

Figure 1:
FIG. 1 is an SEM (scanning electron micrograph) of tantalum fibers prepared according to known metallurgical drawing techniques.

The starting material for the fibers of the present invention can, for example, be tantalum powder produced by conventional methods e.g. by hydriding an electron beam melting tantalum ingot. Note commonly assigned U.S. Pat. No. 4,502,884, the disclosure which is incorporated by reference. The tantalum hydride is crushed, screened, degassed and mixed with an auxiliary metal such as copper powder. The powder mixture is placed in a tube and the tube subject to working on a rolling mill. The rolling action causes the tantalum powder in spherical form to elongated into short rods. Because of the body center cubic (BCC) nature of the tantalum crystal structure when it is extruded in this manner, the tantalum elongates by slipping along its planes. So although they are referred to as "rods" of material, they are more ribbon shaped or shaped like blades of grass. The individual rods of tantalum are obtained by removing the copper with mineral acids.

Either starting material may also be from drawn tantalum rods, e.g., via wire-type processing as described in Example 1.

Although many of the advantages of the present invention can be accomplished with the ribbon-like form of this material with the critical randomizing step recited below, even greater advantages can be realized when the randomizing step is coupled with the cylindricalizing step also described below.

The next step in the process, which is critical to obtaining the improved properties described for both the bonded particle and the capacitor is the randomizing step. By randomizing is meant causing the ribbon-like fibers to be randomly oriented in a substantially non-aligned array. Such random non-alignment is essential to preserve the surface area and attendant improved capacitance of the tantalum powder in subsequent heat treatment or sintering steps. If the fibers are not forced into this substantially non-aligned array, the sintering, purifying or cylindricalizing of the felt, particles or pellet will cause adjoining tantalum fibers to fuse together along their length, forming a body with significantly reduced surface area and capacitance.

The randomizing step can be accomplished in many ways. The preferred method for randomizing the fibers is to tumble the fibers in a glass container while misting with a volatile carrier such as water or alcohol (preferably methanol alone, although binders can be added such as paraffins, e.g. stearic acid). The methanol (or other carrier with or without a binder) causes the fibers to temporarily bond together causing a substantially spherical agglomerate of fibers. These agglomerates can be observed forming through the glass container. From time to time the contents of the container is emptied and screened, typically through a $-40$ mesh screen. The smaller particles fall through the screen and are collected. The larger particles are broken up and returned to the tumbler. The smaller particles are heated in a vacuum to evaporate the methanol binder and cause the fibers to bond in an immobile form such that they cannot realign. Additional heating can also cause the fibers to be purified, and cylindricalized (see below). The agglomerates (or particles) typically have a diameter up to about 2,000 microns, preferably up to about 500 microns, and most preferably between about 25 and 250 microns.

As mentioned above, the body of the capacitor can be a felt material. The felt capacitor material containing fibers of tantalum, columbium, or alloys thereof, can be made by dispersing the fibers in a carrier, typically water, the fibers having a length of up to about 400 microns, and removing the water or other carrier by filtering. The fibers in the felt are also randomly oriented in a substantially non-aligned porous array.

If the proper temperatures are used for the bonding step this causes the ribbon-like fibers to also become cylindrical in form, thereby further increasing the thermal and electrochemical stability of the fibers. The randomized bonding which takes place with the cylindrical fibers is less reducing to the available surface area than similar bonding with the ribbon-like fibers. Although higher temperatures can be used for lesser periods of time, in view of the 30 minute time frame typically used in commercial-type processes, based on the size of the fibers, temperatures of at least 1400° C. are typically used (e.g. 1400° C. to 2400° C.) to cylindricalize the fibers, and preferably temperatures in excess of 1450° C. (e.g., 1450° C. to 1470° C.; 1750° C.) for periods of time of at least 20 minutes, and typically at least 30 minutes.

The temperatures used for the bonding, purifying, and cylindricalizing can vary depending on the diameter and length of the fibers. By purifying is meant burning off impurities and reducing oxygen levels in the fibers. Purification typically takes place at temperatures in excess of 1200° C. and can go as high as 2400° C. These temperatures should be maintained for at least 10 minutes and preferably at least 30 minutes.

The purification and cylindricalization steps remove superfluous surface texture with its associated high oxygen content thus allowing for a low oxygen product. Also removed are other impurities such as carbon and metals which could disrupt the formation of the oxide dielectric layer which could adversely affect the performance of the capacitor, for example by causing leakage current or complete failure by dielectric breakdown.

The fibers are typically up to about 1 micron in diameter, preferably up to about 0.33 micron in diameter, and most preferably about 0.2 to about 1 micron in diameter. The length of the fibers is typically up to about 400 microns in length, preferably up to 250 microns in length, and most preferably 50 microns to 100 microns in length. These fibers typically have an aspect ratio of at least 10 to 1, and generally up to about 20 to 1.

For fibers of this size, after being randomized, the bonding, purifying and cylindricalizing, can be done serially as described above, or can all take place at the one temperature, e.g. at about 1500° C.

Once the (preferably $-40$) mesh particles are formed, they are processed into pellets by the conventional processes currently used to form such pellets from conventional tantalum powder.

The pellets formed by this process are next subjected to anodizing to form a dielectric oxide layer on the surface of the fiber. The oxide layer is typically $Ta_2O_5$. The anodization is performed in conventional manner by making the tantalum the anode in the presence of the electrolyte.

The electrolyte used in the capacitor is typically conventional $MnO_2$ or sulfuric acid. It is introduced into the pressed pellets by impregnation under pressure, or in the case of $MnO_2$, by the thermal decomposition of a manganous nitrate solution.

The anode terminal is typically tantalum wire although other conductors can be used. The length and diameter of the wire depends on the use which the capacitors will be put. The wire can be welded to the tantalum pellet or simply inserted and pressed along with the pellet.

EXAMPLE 1

A tantalum rod 1 centimeter in diameter was encased in copper and drawn to small size through appropriate dies. The resultant wire was cut into short lengths and bundled into a second copper billet. This process of drawing, cutting, and rebundling was repeated until the contained tantalum pieces had been reduced to 1 micrometer in diameter. At this stage the product was digested in nitric acid to remove the copper and liberate the contained tantalum fibers. These are shown in FIG. 1. In this form the material exhibits the rough surface, irregular cross-section shape, and high degree of alignment characteristic of tantalum fibers describe previously. In this form the fibers cannot provide the high degree of sintering stability featured by fiber processed according to the present invention. Further, because of the ribbon-like cross-section shape of these fibers, they would suffer a large loss of microfarad volts per gram (ufv/g) as the anodizing voltage is increased, seriously limiting the useful voltage for capacitors made from such fibers.

EXAMPLE 2

Figure 2:
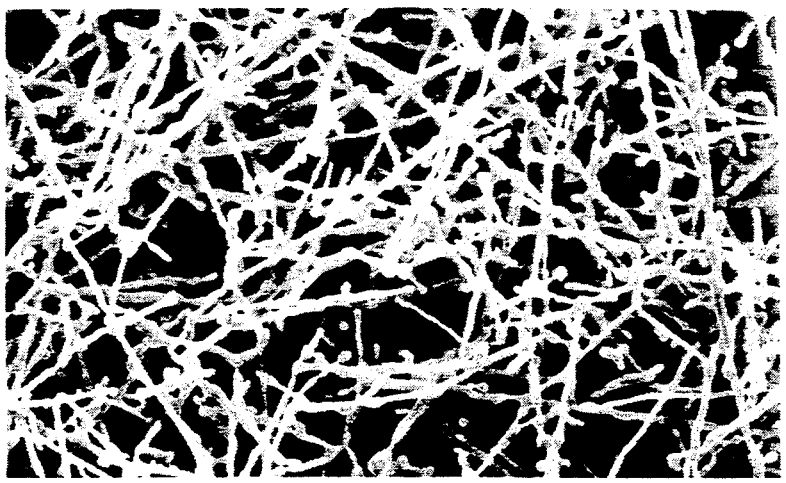
FIG. 2 is an SEM of the tantalum fibers of FIG. 1 after randomizing and cylindricalizing.

The extruded tantalum fiber described in Example 1 was mechanically chopped to millimeter lengths and dispersed in a liquid to randomize the fibers. This suspension was filtered to recover the random network of fibers in the form of a felt disk. This felt was sintered at 1750° C. for 5600 seconds without the use of any sinter-inhibiting substances such as phosphorus. The structure of this material is shown in FIG. 2. This felt had 20,000 ufv/g capacitance when anodized to 80 volts with only 15 ufv/g loss per volt. The combination of high ufv/g and low rate of ufv/g loss on anodizing is highly unusual for a tantalum capacitor sintered at 1750° C., and is a direct consequence of this unique anode micro-architecture.

EXAMPLE 3

Figure 4:
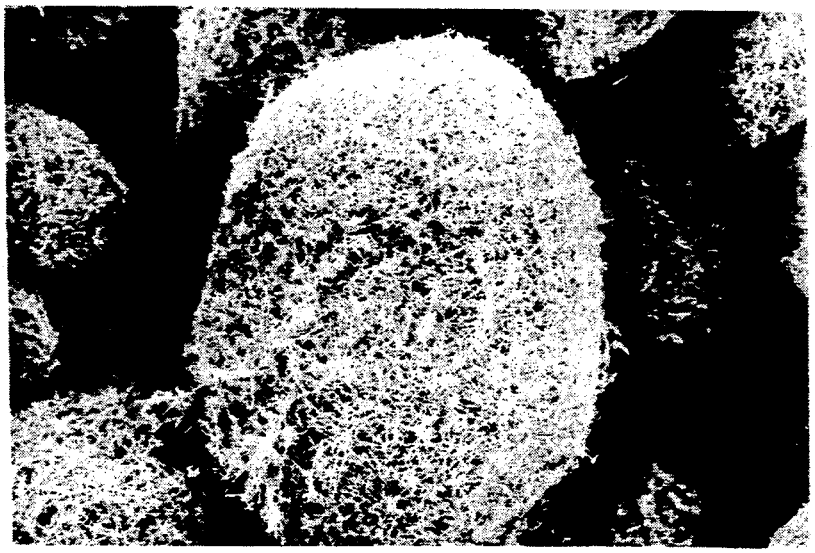
FIG. 4 is an SEM of particles of bonded fibers according to the present invention.

Tantalum fibers prepared by the conventional extrusion techniques described in Example 1 were hydrided and comminuted to short lengths (about 100 micrometers long). These short individual fibers were tumbled to randomize their relative orientations. This tumbling process was controlled so as to provide the formation of −40 mesh sized, mechanically bound, agglomerates of fibers. This reproduced a powder wherein each particle agglomerate had a microstructure of randomly oriented fibers. When this powder was heat treated at 1600° C. for 1800 seconds, the individual fibers were cylindricalized, and the random agglomerate structure stabilized by fiber-to-fiber bonding (sintering). This powder product is shown in FIG. 4. This powder was pressed into anode pellets at 5.0 g/cc density and sintered, as per the conventional practice of making capacitors from tantalum powders, at 1462° C. for 1800 seconds, 1554° C. for 1800 seconds, and 1649° C. for 1800 seconds. The pellets were then anodized to 80 volts and their capacitances measured. The ufv/g at the three sinter conditions were respectively 21,008; 19,672; and 17,169. These illustrate the low loss of ufv/g on sintering that is unique to the current invention product.

EXAMPLE 4

Figure 3:
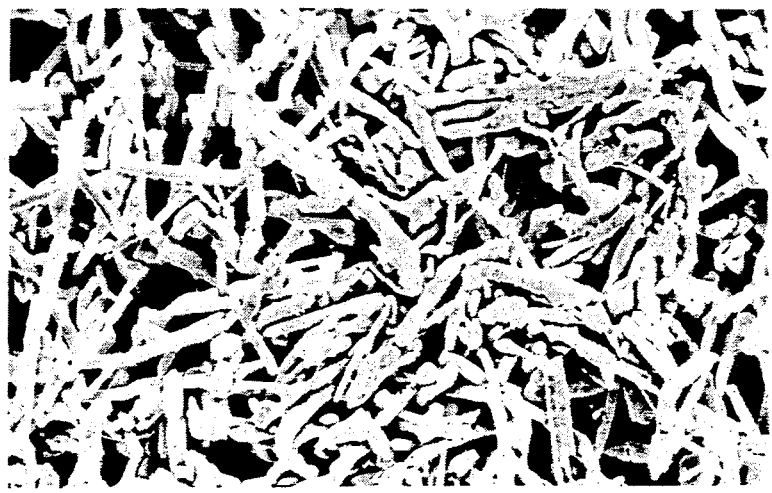
FIG. 3 is an SEM of the fibers of FIG. 1 without randomizing but still cylindricalized.

Tantalum fiber prepared by the extrusion techniques described in Example 1 was cylindricalized through exposure to heat treatment at 1720° C. for 1800 seconds without the benefit of the randomizing process of the present invention. This example was intended to demonstrate the detrimental effects of not randomizing the fibers prior to cylindricalizing. The product of this example is shown in FIG. 3. This shows the need for the randomizing step because of the obvious formation in this case of many multi-fiber clusters which coalesced during cylindricalizing into large, unstable, low surface area shapes. By comparison the fibers in FIG. 3 have clearly stabilized at uniformly small diameter cylinders because of their random orientation. The powder in this Example was pressed into capacitor anode pellets and sintered at 1480° C. for 1800 seconds, 1560° C. for 1800 seconds, and 1650° C. for 1800 seconds. When anodized to 100 volts, these pellets showed the following levels of ufv/g at the respective sinters: 11,775, 11,633, and 10,836. These data show the ufv/g was approximately half of that achieved when the randomizing step was used in Example 4 proving the large benefit gained from this aspect of the present invention.

All of the fibers, particles, felt, and pellets can be tantalum, columbium, or alloys thereof although tantalum is preferred. The pellets typically have a diameter up to about 2,000 microns. The pellets typically have a length up to 4,000 microns. Larger pellets can also be made.

While the ribbon form of the fibers can be used to make up the particles and the pellets, the cylindrical form is preferred. The particles formed from the fibers are typically spherical in shape.

The comminuting, e.g. as disclosed in Example 3, can take place using any conventional method which can generate fibers of the desired length. However, the problem with most conventional methods, i.e. ball milling, is the generation of ultra-fine particles which can interfere with the desired fibrous shape, causing additional problems during sintering. The preferred method would be to comminute the hydrided tantalum fibers by placing them in a liquid medium such as water in an apparatus which would cause an intense turbulence in the medium, such as a conventional high speed blender (e.g. Waring) until the desired fiber length is achieved (e.g. for starting lengths of about 6 inches, agitating for about a minute will reduce most of the fibers to lengths less than 200 microns).

Figure 5:
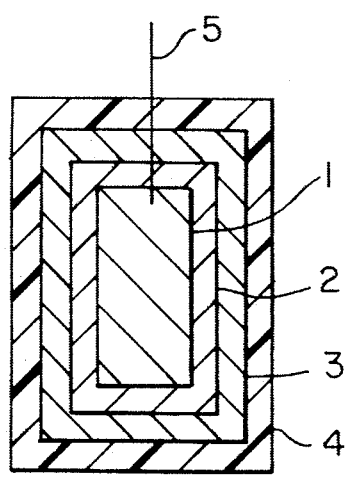
FIG. 5 is a typical capacitor according to the present invention.

The pellet can be formed into a conventional capacitor, or example, see FIG. 5, where the tantalum pellet (1) containing the fibers (including an oxide layer and an electrolyte) is covered with a layer (2—typically carbon), a layer of metal (3—typically silver or tantalum), and finally a polymer (4—typically polyethylene, polypropylene, or an acrylic polymer). A tantalum lead wire (5) is also shown.

The cylindrical metal fibers also consist essentially of tantalum, columbium, or alloys thereof. The fibers are typically heated at a temperature and for a period of time sufficient to produce a substantially circular cross-section. Typically, the heating takes place at a temperature of at least 1400° C. for a period of time of at least 30 minutes.

As stated above, the bonded particles of tantalum, columbium, or alloys thereof, are made by tumbling the fibers so as to cause them to randomly orient in a substantially non-aligned, porous array. The fibers have a length of up to about 400 microns. The tumbling typically takes place in methanol which causes the particles to hold together in this array prior to the heat treatment. The heating can take place at this stage in basically three levels, at a temperature high enough to cause them to bond in said non-aligned array, heating the fibers at a temperature high enough to cause the individual fibers to form a substantially circular cross-section, and finally heating the fibers at a temperature high enough to purify the fibers. (It should be noted that the purification takes place continually as the fibers are heated, e.g. different impurities or levels of impurities are removed at different temperatures.)

When making the capacitor, the particles of randomly oriented, substantially non-aligned, porous array of fibers are pressed in conventional manner and heated at a temperature sufficient to bond the particles together. Optionally, the fibers can be heated at a temperature high enough to purify the fibers. Additional heating can also be performed to cause the individual fibers to form a substantially circular cross-section.

The capacitors of the present invention have utility and advantages similar to those of conventional tantalum capacitors in that they can be used for miniature circuits at high temperatures with great reliability. However, since the fibers in the capacitors have increased surface area, the capacitors according to the present invention have improved specific capacitance (and volumetric efficiency). What this translates into is that more charge can be held for capacitors the same size as conventional capacitors, or a smaller capacitor can be used to hold the same charge as a conventional sized capacitor. In either case additional miniaturization can be used. Furthermore, because of the cylindrical shape of the fibers, higher temperatures can be used to clean (purify) the tantalum without significantly increased loss of surface area. This means that cleaner fibers can be used resulting in greater reliability, performance etc. of the capacitors attendant with a cleaner starting material. As was shown, another benefit of the substantially circular cross-section shape in the preferred form of the invention is a low loss of ufv/g during the anodization process.

I claim:

1. Cylindrical metal fibers having a substantially circular cross-section up to about 3 microns in diameter consisting essentially of tantalum, columbium, or alloys thereof.

2. The fibers of claim 1 having a diameter up to about 1 micron.

3. The fibers of claim 1 having a diameter up to about 0.33 micron.

4. The fibers of claim 1 having a diameter of about 0.2 to about 1.0 micron.

5. The fibers of claims 1, 2, 3 or 4 having an aspect ratio of at least 10 to 1.

6. The fibers of claim 5 having an aspect ratio of up to 20 to 1.

7. The fibers of claims 1, 2, 3 or 4 having a length up to 400 microns.

8. The fibers of claims 1, 2, 3 or 4 having a length up to 250 microns.

9. The fibers of claims 1, 2, 3 or 4 having a length of 50 microns to 100 microns.

10. A method of making cylindrical metal fibers consisting essentially of tantalum, columnbium, or alloys thereof comprising heating said fibers at a temperature and for a period of time sufficient to produce fibers having a substantially circular cross-section.

11. The process of claim 10 wherein the heating takes place at a temperature of at least 1400° C.

12. The process of claim 10 wherein the heating takes place at about 1400° C. to about 2400° C.

13. The process of claim 11 wherein the heating takes place at about 1450° C. to about 1470° C.

14. The process of claim 10 wherein the heating takes place at about 1750° C.

15. The process of claims 11, 12, 13, or 14 wherein the heating takes place for at least 20 minutes.

16. The process of claims 11, 12, 13, or 14 wherein the heating takes place for at least 30 minutes.

* * * * *